United States Patent
Kuscher et al.

(10) Patent No.: US 9,203,838 B2
(45) Date of Patent: Dec. 1, 2015

(54) PROVIDING NETWORK ACCESS TO A DEVICE ASSOCIATED WITH A USER ACCOUNT

(71) Applicant: Google Inc., Mountain View, CA (US)

(72) Inventors: Alexander Friedrich Kuscher, San Francisco, CA (US); Trond Thomas Wuellner, Mountain View, CA (US); Kan Liu, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 58 days.

(21) Appl. No.: 13/665,816

(22) Filed: Oct. 31, 2012

(65) Prior Publication Data
US 2014/0123232 A1 May 1, 2014

(51) Int. Cl.
*H04L 29/06* (2006.01)
*H04W 12/08* (2009.01)

(52) U.S. Cl.
CPC ........... *H04L 63/0876* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 7,185,363 B1 * | 2/2007 | Narin et al. | 726/6 |
| 7,382,268 B2 | 6/2008 | Hartman | |
| 7,487,170 B2 * | 2/2009 | Stevens | 1/1 |
| 7,603,435 B2 * | 10/2009 | Welingkar et al. | 709/217 |
| 7,657,594 B2 * | 2/2010 | Banga et al. | 709/203 |
| 7,697,942 B2 * | 4/2010 | Stevens | 455/456.1 |
| 7,865,964 B2 * | 1/2011 | Narin et al. | 726/30 |
| 8,526,885 B2 * | 9/2013 | Lin et al. | 455/41.3 |
| 8,793,758 B2 * | 7/2014 | Raleigh et al. | 726/1 |
| 2008/0113665 A1 * | 5/2008 | Paas et al. | 455/426.1 |
| 2009/0260064 A1 * | 10/2009 | McDowell et al. | 726/4 |
| 2011/0250909 A1 | 10/2011 | Mathias et al. | |
| 2011/0283001 A1 | 11/2011 | Jung et al. | |
| 2011/0294502 A1 | 12/2011 | Oerton | |

(Continued)

FOREIGN PATENT DOCUMENTS

| | | | | |
|---|---|---|---|---|
| EP | 2503826 | | 9/2012 | |
| WO | WO 2010/112064 A1 * | | 10/2010 | H04L 29/06 |
| WO | WO-2011/101852 A2 | | 8/2011 | |

OTHER PUBLICATIONS

"WiFi Tethering", <http://www.appbrain.com/app/wifi-tethering/og.android.tether>, Open Garden Inc., visited Sep. 16, 2013.

(Continued)

*Primary Examiner* — Christopher Revak
(74) *Attorney, Agent, or Firm* — McDermott Will & Emery LLP (57) ABSTRACT

A system and method for registering a client device to obtain network access from a provider device. A server receives an authorization request for a user account to provide network access from provider devices associated with the user account to client devices associated with the user account. The server receives a unique identifier for each of the client devices, and provides the unique identifier for each of the client devices to each of the provider devices. The server provides an indication to at least one provider device to monitor for a request for network access from at least one client device, the request from the client device comprising the unique identifier of the client device. The provider device is configured to provide network access information to the client device in response to the request.

22 Claims, 7 Drawing Sheets

(56) References Cited

U.S. PATENT DOCUMENTS

| | | | |
|---|---|---|---|
| 2011/0302643 A1* | 12/2011 | Pichna et al. | 726/7 |
| 2012/0030070 A1* | 2/2012 | Keller et al. | 705/28 |
| 2012/0240197 A1* | 9/2012 | Tran et al. | 726/4 |
| 2012/0254040 A1* | 10/2012 | Dixon et al. | 705/44 |
| 2012/0254142 A1* | 10/2012 | Knowlton et al. | 707/705 |
| 2012/0324067 A1* | 12/2012 | Hari et al. | 709/222 |

OTHER PUBLICATIONS

"Barnacle Wifi Tether," <http://www.appbrain.com/app/barnacle-wifi-tether/net.szym.barnacle>, szym.net, visited Sep. 16, 2013.

"My Wi On Demand," <http://www.intelliborn.com/mywiondemand.html>, Intelliborn Corporation, visited Sep. 16, 2013.

* cited by examiner

PROVIDING NETWORK ACCESS TO A DEVICE ASSOCIATED WITH A USER ACCOUNT

BACKGROUND

The present disclosure generally relates to network access for devices, and, in particular, to providing network access to a device associated with a user account.

Tethering refers to connecting one device to another. For example, tethering allows sharing a network connection of a provider device with a client device. Certain provider devices (or "hotspots") connected to a network such as the Internet can permit other pre-configured client devices to share the network connection by connecting to the hotspot. For example, a smartphone with Internet access can broadcast a WiFi signal that permits a client device, such as a tablet computer, to connect to the smartphone over WiFi in order to obtain Internet access. The tablet computer, however, requires appropriate authorization information to connect to the smartphone, such as a WiFi network name and password required for the smartphone. In each instance that a user wants to connect a client device to a provider device, the user must configure the client device and the provider device with the appropriate authorization information. This process can be inconvenient if the provider device has a limited input interface, such as a smartphone, or if a user has multiple client devices to connect to the provider device.

SUMMARY

The disclosed subject matter relates to computer-implemented method for registering a client device to obtain network access from a provider device. The method comprises receiving, at a server, an authorization request for a user account to provide network access from one or more provider devices associated with the user account to one or more client devices associated with the user account, and receiving a unique identifier for each of the one or more client devices. The method further comprises providing, from the server, the unique identifier for each of the one or more client devices to each of the one or more provider devices, and providing an indication to at least one of the one or more provider devices to monitor for a request for network access from at least one of the one or more client devices, the request from the at least one client device comprising the unique identifier of the at least one client device. The at least one provider device is configured to provide network access information to the at least one client device in response to the request.

The disclosed subject matter further relates to system for registering a client device to obtain network access from a provider device, the system comprising one or more processors, and a machine-readable medium comprising instructions stored therein, which when executed by the processors, cause the processors to perform operations comprising receiving an authorization request for a user account to provide network access from one or more provider devices associated with the user account to one or more client devices associated with the user account. The operations further comprise receiving a unique MAC address for each of the one or more client devices, providing the unique MAC address for each of the one or more client devices to each of the one or more provider devices, and providing an indication to at least one of the one or more provider devices to monitor for a request for network access from at least one of the one or more client devices, the request from the at least one client device comprising the unique MAC address of the at least one client device. The at least one provider device is configured to provide network access information to the at least one client device in response to the request.

The disclosed subject matter also relates to computer-implemented method for providing network access to a client device. The method comprises receiving, from a server, a unique identifier for a client device associated with a user account, and receiving, from the server, an indicator to monitor for a request from the client device, wherein the request is for network access for the client device. The method further comprises monitoring, in response to receiving the indicator, for the request from the client device, receiving the request from the client device, the request comprising the unique identifier of the client device, and verifying whether the unique identifier of the client device is associated with the user account. In addition, the method comprises providing, if the unique identifier of the client device is verified as being associated with the user account, access information to the client device for connecting to the provider device to obtain network access.

The disclosed subject matter further relates to provider device for providing network access to a client device, the device comprising one or more processors, and a machine-readable medium comprising instructions stored therein, which when executed by the processors, cause the processors to perform operations comprising receiving, from a server, a unique identifier for a client device associated with a user account. The operations further comprise receiving, from the server, an indicator to monitor for a request from the client device, wherein the request is for network access for the client device, monitoring, in response to receiving the indicator, for the request from the client device, and receiving the request from the client device, the request comprising the unique identifier of the client device. In addition, the operations comprise verifying whether the unique identifier of the client device is associated with the user account, and if the unique identifier of the client device is verified as being associated with the user account, establishing a peer-to-peer connection with the client device, and providing access information to the client device for connecting to the provider device to obtain network access, via the established peer-to-peer connection.

The disclosed subject matter also relates to computer-implemented method for connecting a client device to a provider device for network access. The method comprises receiving, on a client device associated with a user account, a request for network access from a provider device associated with the user account, sending, to the provider device, a request for network access, the request comprising a unique identifier of the client device, and receiving, from the provider device associated with the user account, access information for connecting to the provider device to obtain the network access. The method further comprises connecting to the provider device to obtain network access using the received access information.

The disclosed subject matter further relates to client device for connecting to a provider device for network access, the device comprising one or more processors, and a machine-readable medium comprising instructions stored therein, which when executed by the processors, cause the processors to perform operations comprising receiving a request for network access from a provider device associated with the user account. The operations further comprise sending, to the provider device, a request for network access, the request comprising a unique identifier of the client device, establishing a peer-to-peer connection with the provider device, receiving, from the provider device associated with the user account and via the established peer-to-peer connection, access information for connecting to the provider device to obtain the network access, and connecting, via the established peer-to-peer connection, to the provider device to obtain network access using the received access information.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, tethering refers to connecting one device to another. For example, tethering allows sharing a network connection of a provider device with a client device. Provider devices (or "hotspots") connected to a network such as the Internet can permit other pre-configured client devices to share the network connection by connecting to the hotspot. For example, a smartphone with Internet access can broadcast a WiFi signal that permits a client device, such as a tablet computer, to connect to the smartphone over WiFi in order to obtain Internet access. The tablet computer, however, requires appropriate authorization information to connect to the smartphone, such as a WiFi network name and password required for the smartphone. In each instance that a user wants to connect a client device to a provider device, the user must configure the client device and the provider device with the appropriate authorization information. This process is often inconvenient if the provider device has a limited input interface, such as a smartphone, or if a user has multiple client devices to connect to the provider device.

The subject technology allows a user in one submission to authorize each of the provider devices and client devices to share network access, and thereafter each of the client devices can automatically connect to and share a network connection with one of the accessible provider devices. Specifically, a user signs into a server interface with a user account, and using the interface the user authorizes each device associated with the user account (and/or other authorized user accounts) to share a network connection. The interface also obtains unique identifiers, such as Media Access Control (MAC) addresses, for each of the user's devices in order to identify the user's devices. The unique identifiers of the client devices are sent to the provider devices. Thereafter, when a user requests that the client device be connected with a nearby provider device associated with a user account, the client device broadcasts, to all nearby devices, a request including the client device's unique identifier. The request is received by the nearby provider device. The provider device, upon verifying that the unique identifier in the request is associated with the user, creates a peer-to-peer (e.g., Bluetooth) network connection between the client device and provider device. The provider device then sends the appropriate network access information to the client device over the peer-to-peer connection, and the client device uses the network access information to connect to the provider device on the same or different network (e.g., WiFi) in order to obtain network access.

Figure 1:
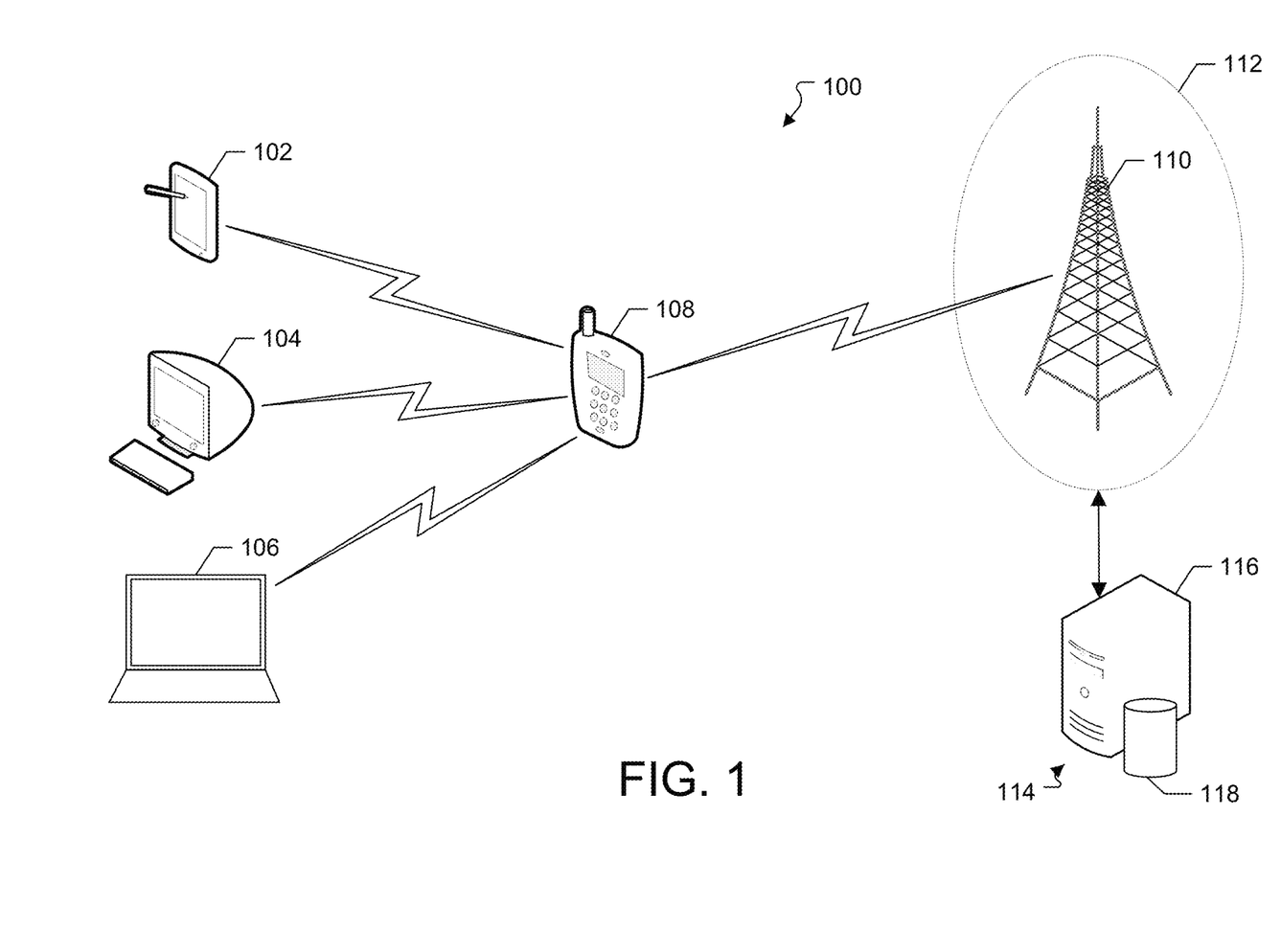
FIG. 1 illustrates an example network environment which can provide network access to a client device associated with a user account.

FIG. 1 illustrates an example network environment which can provide network access to a client device associated with a user account. A network environment 100 includes an electronic device 108 (hereinafter "provider device 108"), other electronic devices 102-106 (hereinafter "client devices 102-106), a wireless network 112 (e.g., including tower station 110), and server 114.

Server 114 includes a processing device 116 and a data store 118. Processing device 116 executes computer instructions stored in data store 118, for example, to host an application. Users can interact with the application, for example via network 112 using provider device 108. Alternatively, or in addition, the users can interact with the application using any of client devices 102-106, via network access provided by provider device 108.

Provider device 108 and client devices 102-106 can be computing devices such as laptop or desktop computers, smartphones, PDAs, portable media players, tablet computers, or other appropriate computing devices. In the example of FIG. 1, provider device 108 is depicted as a smartphone, and client devices 102-106 are depicted as a PDA, a desktop computer, and a laptop computer, respectively.

In example aspects, server 114 can be a single computing device such as a computer server. In other aspects, server 114 can represent more than one computing device working together to perform the actions of a server computer (e.g., cloud computing). Examples of computing devices that can be used to implement server 114 include, but are not limited to, a web server, an application server, a proxy server, a network server, or a group of computing devices in a server farm.

In example aspects, network 112 is a wide area network (e.g., the Internet). Communications between any of client devices 102-106, provider device 108 and/or server 114 can be facilitated through a communication protocol such as Hypertext Transfer Protocol (HTTP). Other communication protocols can also be facilitated for some or all communication between client devices 102-106, provider device 108 and/or server 114, including for example, Extensible Messaging and Presence Protocol (XMPP) communication.

As can be seen in FIG. 1, provider device 108 can operate as a router for a number of other devices (e.g., client devices 102-106) configured to communicate wirelessly with provider device 108. Alternatively, or in addition, provider device 108 and one or more other communication or data processing devices can be configured to automatically set up an ad hoc network, for example a Wi-Fi Direct or another suitable protocol. In the example of FIG. 1, each of client devices 102-106 communicates with provider device 108 over a wireless link.

Although each of client devices 102-106 is shown communicating with provider device 108 over a wireless link, one or more of client devices 102-106 can be connected to provider device 108 over a fixed connection, such as via a data port. Given space constraints, provider device 108 can have limited data ports. Client devices 102-106 (e.g., laptop 106) can be provided with a number of data ports to permit the other client devices (e.g., PDA 102, desktop computer 104) to be connected over a fixed connection. In addition, client devices 102-106 can be configured to enter into ad hoc networks with another one of these devices.

Provider device 108 is in communication with wireless network 112, including a tower station 110. Provider device 108 thus can have access to data services over a data-centric network, and through its operation as a router for client devices 102-106, can provide these other devices with connectivity to the Internet or another wide area data network, for example, using the wireless network 112 as a backhaul link. As used herein, operation in this mode is referred to as providing a "hotspot" for client devices 102-106. When one or more of client devices 102-106 is within the vicinity of provider device 108 while provider device 108 is operating as a hotspot, the one or more of client devices 102-106 can connect to provider device 108 (e.g., subject to any authentication or other security restrictions implemented by provider device 108) and thereby access the wide area network (e.g., the Internet).

Provider device 108 can include a communication component (not shown) which receives messages from and sends messages to wireless network 112. The communication component can correspond to a single component, or to multiple components. For example, the communication component is configured in accordance with one or more of Global System for Mobile Communication (GSM), General Packet Radio Services (GPRS) standards, Enhanced Data GSM Environment (EDGE), Universal Mobile Telecommunications Service (UMTS), or any other suitable standard. The wireless link connecting the communication component with the wireless network 112 represents one or more different Radio Frequency (RF) channels, for example, operating according to defined protocols specified for GSM, GPRS, EDGE, UMTS or optionally other network communications. With some network protocols, these channels are capable of supporting both circuit-switched voice communications and packet-switched data communications.

Other wireless networks can also be associated with provider device 108. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. An example of a data-centric network includes WiFi 802.11 communication systems. Examples of voice-centric data networks include Personal Communication Systems (PCS) networks like GSM and Time Division Multiple Access (TDMA) systems. The communication component of provider device 108 can provide for WLAN communication, and can operate in accordance with a known network protocol such as one or more of the 802.11 family of standards developed by IEEE.

In example aspects, each of client devices 102-106, such as the laptop 106, can be similarly equipped to communicate over the wireless network 112 and to provide WLAN or LAN connectivity to other devices (e.g., 102, 104, 108), and can be used in place of provider device 108 as the "hotspot". In example aspects, if the laptop 106 is not provided with on-board wireless network or WLAN/LAN functionality, this functionality can be provided, for example, with an expansion card installed in the laptop 106, or via a dongle or other external hardware device.

Figure 2:
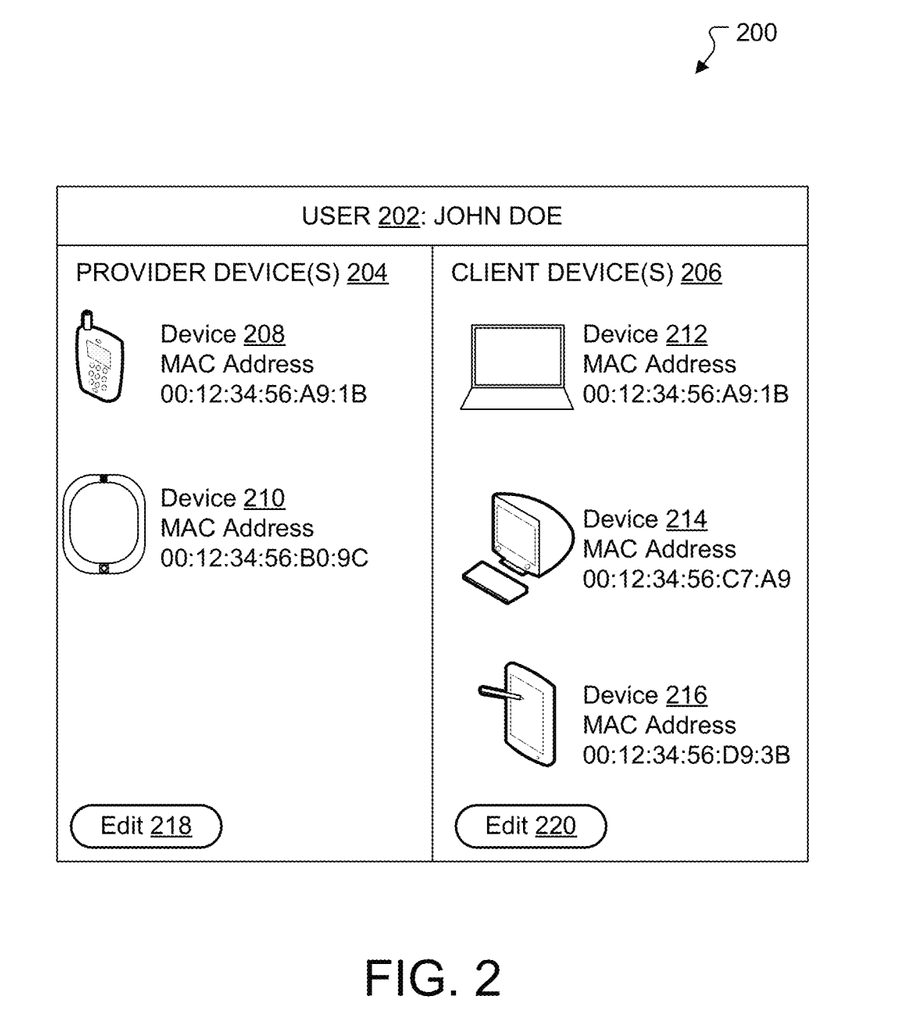
FIG. 2 illustrates an example user interface which identifies provider devices and client devices associated with a user account.

FIG. 2 illustrates an example user interface which identifies provider devices and client devices associated with a user account. User interface 200 includes a user name region 202, a provider device(s) region 204 and a client device(s) region 206.

Provider device(s) region 204 allows for a user to view and edit the devices associated with a user account that the user wishes to designate as a provider device. As noted above, a provider device can be used to provide network access to one or more client devices, where the provider device acts as a hotspot for the one or more client devices. In the example of FIG. 2, the user account is associated with two provider devices, namely devices 208 and 210. Each of devices 208 and 210 can correspond, for example, to provider device 108 of FIG. 1.

Provider device(s) region 204 can further include an edit interface (e.g., button 218) for editing the list of provider devices. For example, using button 218, the user can add or remove devices to and from the list of devices within provider device(s) region 204. In example aspects, if the user chooses to add a provider device, a list of devices associated with the user account can be displayed, and the user can select a device from the displayed list to add as a provider device. The list of devices can correspond to all devices associated with the user account, or can be filtered to display only those devices associated with the user account which are capable of acting as a provider device.

Client device(s) region 206 allows for a user to view and edit the devices associated with a user account that the user wishes to designate as client devices. As noted above, a client device can communicate with a provider device, in order to obtain network access using provider device. In the example of FIG. 2, the user account is associated with three client devices, namely devices 212, 214 and 216. Each of devices 212-216 can correspond, for example, to any of client devices 102-106 of FIG. 1.

Client device(s) region 206 can further include an edit interface (e.g., button 220) for editing the list of client devices. For example, using button 220, the user can be prompted to add or remove devices to and from the list of devices within client device(s) region 204. In example aspects, if the user chooses to add a client device, a list of devices associated with the user account can be displayed, and the user can select a device from the displayed list to add as a client device. The list of devices can correspond to all devices associated with the user account, or can be filtered to display only those devices associated with the user account which are capable of acting as a client device.

As can be seen in FIG. 2, within client device(s) region 206, each of devices 212-216 is displayed with a MAC address. The MAC address is a unique identifier assigned to each of devices 212-216, and can therefore be used to identify each of client devices 212-216. As described in further detail below, this unique identifier can be used in providing network access from a provider device to a client device. In addition, with respect to provider device(s) region 204, each of provider devices 208-210 can be displayed with a respective MAC address.

The MAC addresses displayed within user interface 200 can be obtained from (e.g., stored within) user account information for each of the devices associated with the user account. If a MAC address is not already available, the MAC address can be obtained by manual input from the user, or by otherwise querying an individual device for its MAC address, and transferring the MAC address from that device to a server (e.g., server 114) providing user interface 200.

Figure 3:
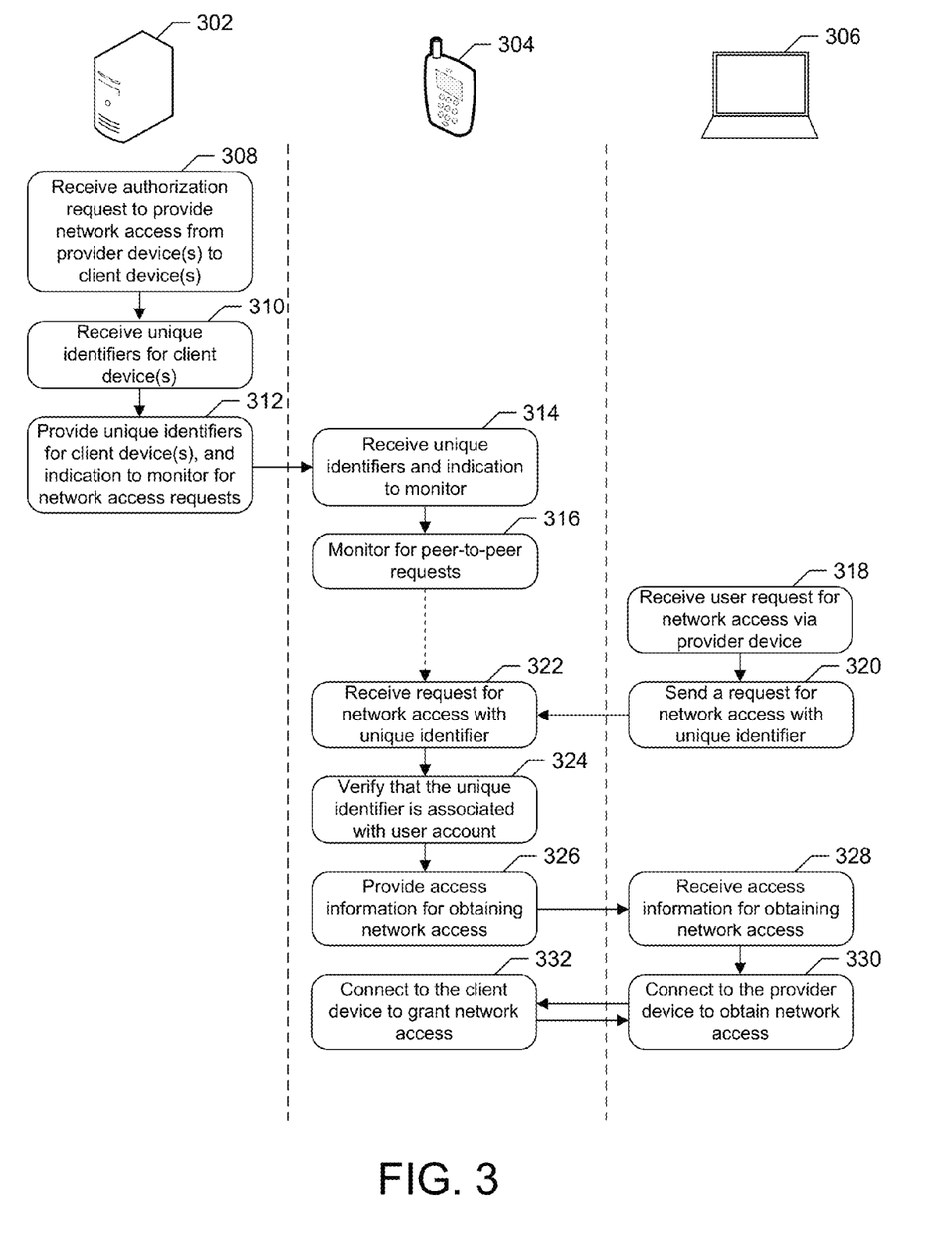
FIG. 3 illustrates an example process by which network access is provided to a client device associated with a user account.

FIG. 3 illustrates an example process by which network access is provided to a client device associated with a user account. FIG. 3 illustrates a server 302, an electronic device 304 (hereinafter "provider device 304") and an electronic device 306 (hereafter "client device 306"). For example, server 302 can correspond to server 114 of FIG. 1, provider device 304 can correspond to provider device 108, and client device can correspond to any of client devices 102-106.

At step 308, server 302 receives an authorization request to provide network access from provider devices (e.g., provider device 304) to client devices (e.g., client device 306). In doing so, the server can receive authentication information for a user account, and can provide for display of a user interface. The user signs into the user interface with a user account, and using the interface, the user authorizes each device associated with the user account (and/or other authorized user accounts) to share a network connection. The user interface can provide for user selection of provider devices (e.g., provider device 304) and of client devices (e.g., client device 306).

At step 310, server 302 receives a unique identifier (e.g., via the user interface provided by server 302) for each client device (e.g., client device 306), in order to identify each client device. In example aspects, unique identifiers can also be obtained for each provider device (e.g., provider device 304) associated with the user account. The unique identifiers can correspond to, but are not limited to, MAC addresses.

As described above with reference to FIG. 2, the unique identifiers can be stored within user account information for each of the devices associated with the user account. In example aspects, if a unique identifier (e.g., MAC address) is not already available within the user account information, the unique identifier can be obtained by manual input from the user, or by otherwise querying an individual device for its unique identifier.

At step 312, server 302 provides the unique identifiers of the client devices, together with an indicator to monitor for a network access request, to provider device 304. Provider device 304 receives this information at step 314. In example aspects, the indicator to monitor for network access can correspond to a flag value (e.g., or other parameter) sent from server 302 to provider device 304 to trigger monitoring for a network access request. At step 316, provider device 304 monitors for peer-to-peer requests for network access via provider device 304.

In example aspects, provider device 304 may continuously or periodically broadcast a signal (e.g., a WiFi signal) that permits client devices (e.g., client device 306) to connect to provider device 304 over WiFi in order to obtain network (e.g., Internet) access. In a case where provider device 304 is not broadcasting this signal, the receipt of the indicator to monitor for network access at step 314 can trigger provider device 304 to start broadcasting this signal and to start monitoring for a requests for network access at step 316.

At step 318, client device 306 receives a request for network access via provider device 304. For example, the request for network access is received from a user via a user interface on client device 306. In another example, the request for network access is an automated request (e.g., sent at predetermined intervals), which is not initiated by the user, performed by client device 306.

At step 320, client device 306 sends a request (e.g., in the form of a broadcast) for network access, together with the unique identifier of client device 306. At step 322, this request is received by provider device 304, which has been monitoring for such a request. In a case where the request for network access is a user request, the sending of the request by client device 306 is performed in response to the received input from the user. In a case where the request for network access is an automated request (e.g., at predetermined intervals), the sending of the request is performed in response to the automated request.

In example aspects, the sending of the request from client device 306 to provider device 304 is based on a predetermined network frequency and/or configuration. The provider device 304 and client device 306 can have respective preconfigured settings for enabling the sending of the request from client device 306 to provider device 304.

At step 324, provider device 304 verifies that the unique identifier of client device 304 is associated with the user account. As described above, provider device 304 was provided with the unique identifiers for each client device associated with the user account (at step 314). Thus, provider device 304 can check the unique identifier received from client device 304 in step 320 against the received list of unique identifiers for authorized client devices. If the unique identifier of client device 304 matches one of the unique identifiers in the list, provider device 304 verifies that the unique identifier of client device 304 is associated with the user account (e.g., is an authorized client).

In example aspects, it is possible that a device associated with a user account is not listed as an authorized client device by the user. In such cases, provider device 302 can determine that the unauthorized device is not verified, thereby denying network access to the unauthorized device, even though the device is otherwise associated with the user account. In denying network access, provider device 304 can provide a notification to the unauthorized device, indicating that network access is not permitted.

At step 326, if the unique identifier is verified, provider device 304 provides access information, for obtaining network access, to client device 306. Client device 306 receives this access information at step 328.

The transfer of access information from provider device 304 to client device 306 can include initiating and establishing a peer-to-peer connection between provider device 304 and client device 306. The peer-to-peer connection can correspond to one or more of Bluetooth, WiFi, direct USB, infrared, non-audible audio waves, or any other type of direct communication protocol. The access information can include any information necessary to provide client device 306 with network access from provider device 304. At steps 330 and 332, client device 306 connects to provider device 304 to obtain network access, based on the access information sent from provider device 304 to client device 306.

It should be noted that FIG. 3 illustrates an example of providing network access to a single client device (e.g., client device 306) from a single provider device (e.g., provider device 304). However, it should be noted that the subject technology can also be employed to provide network access to single or multiple client devices from single or multiple provider devices. In this regard, multiple provider devices can monitor for requests for network access from multiple client devices (e.g., based on the received unique identifiers for the multiple client devices).

As requests for network access are sent (e.g., broadcast) by the multiple client devices, the provider devices can be assigned accordingly. In example aspects, the provider devices are assigned based on proximity to the requesting client devices. For example, the provider device nearest to a particular client device which submitted a request can be assigned to provide network access for that client device. The determination of which provider device is in proximity with (e.g., is nearest to) the requesting client device can be determined based on, but not limited to, one more of global positioning system (GPS), cell tower triangulation and Wi-Fi triangulation between provider and client devices. Alternatively, or in addition, other factors besides proximity can be considered when assigning provider devices to requesting client devices, including but not limited to, signal strength, processing capability, power considerations, etc.

Accordingly, the subject technology allows a user in one submission to authorize each of the provider devices and client devices to share network access, and thereafter each of the client devices can automatically connect to and share a network connection with one of the accessible provider devices. Thus, the subject technology is seen to provide for "zero-touch" tethering capability. In particular, rather than requiring a user to repeatedly perform appropriate authorization information between provider and client devices (e.g., where the user must configure the client device and the provider device with the appropriate authorization information), predesignated authorization information (e.g., a preset authorization of provider and client devices with unique identifiers) can be used to provide client device(s) with network access from provider device(s).

Figure 4:
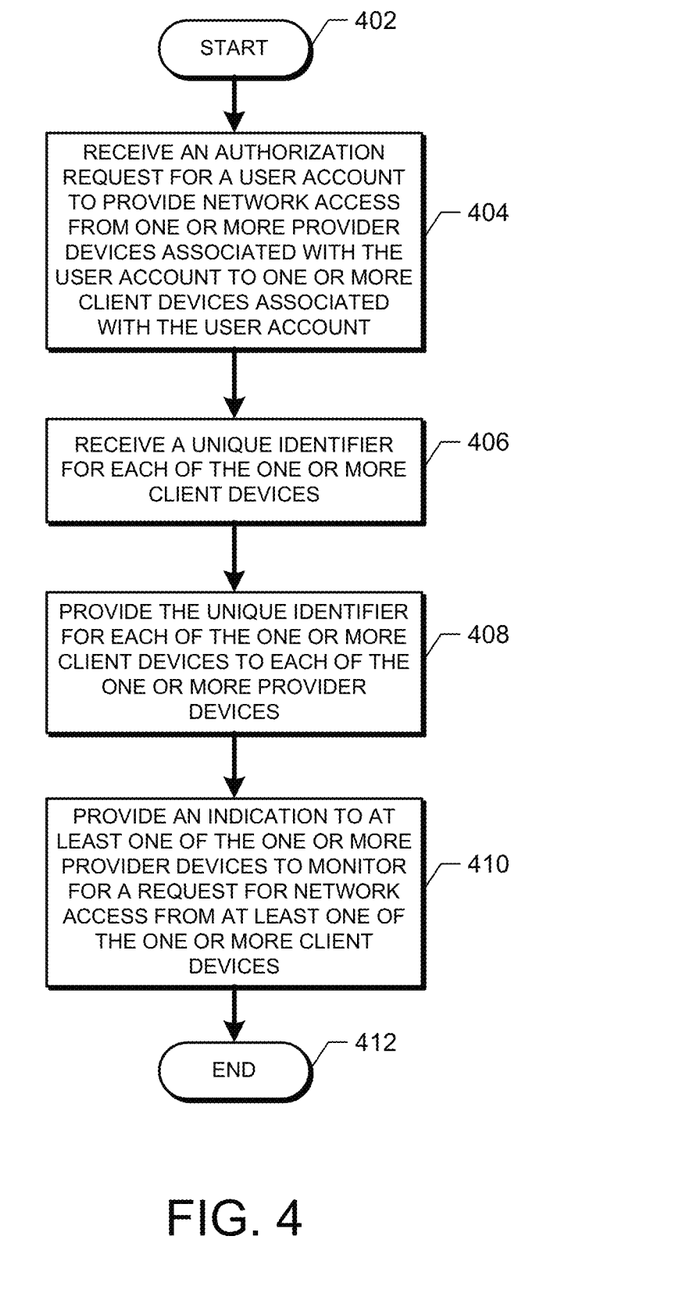
FIG. 4 illustrates an example process, performed by a server, by which a client device is registered to obtain network access from a provider device.

FIG. 4 illustrates an example process, performed by a server, by which a client device is registered to obtain network access from a provider device. For example, the server can correspond to server 114 or to server 302.

Following start block 402, the server receives an authorization request for a user account to provide network access from one or more provider devices associated with the user account to one or more client devices associated with the user account at step 404. In doing so, the server can receive authentication information for the user account.

In addition, the server can display a user interface associated with the user account. The user interface can provide for user selection of the one or more provider devices from among all provider devices associated with the user account, and for selection of the one or more client devices from among all client devices associated with the user account.

At step 406, the server receives a unique identifier for each of the one or more client devices. The unique identifier for each of the one or more client devices can be a MAC address. The above-mentioned user interface can further provide for receiving the unique identifier for each of the one or more client devices (e.g., via manual input or by query to the client device). At step 408, the server provides the unique identifier for each of the one or more client devices to each of the one or more provider devices.

At step 410, the server provides an indication to at least one of the one or more provider devices to monitor for a request for network access from at least one of the one or more client devices, the request from the at least one client device comprising the unique identifier of the at least one client device. The at least one provider device is configured to provide network access information to the at least one client device in response to the request. The process then ends at end block 412.

Figure 5:
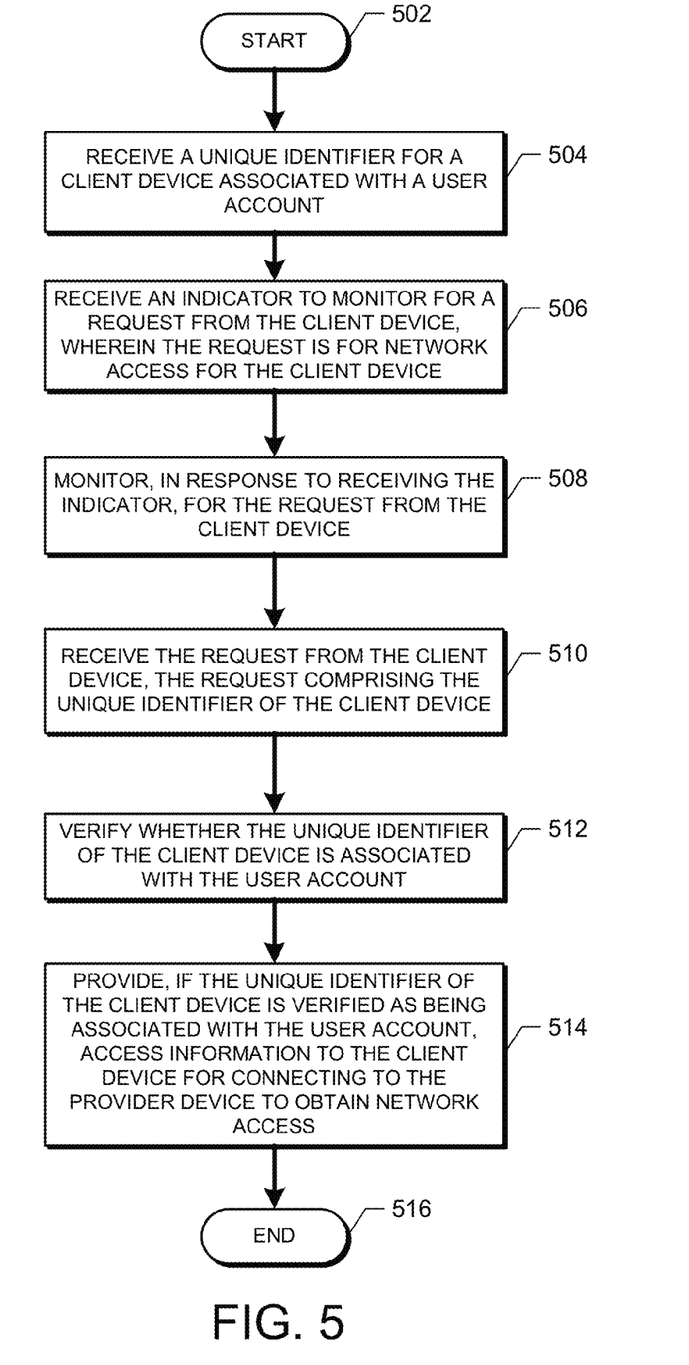
FIG. 5 illustrates an example process, performed by a provider device associated with a user account, by which network access is provided to a client device associated with the user account.

FIG. 5 illustrates an example process, performed by a provider device associated with a user account, by which network access is provided to a client device associated with the user account. For example, the provider device can correspond to provider device 108 or to provider device 304.

Following start block 502, the provider device receives, from a server, a unique identifier for a client device associated with a user account at step 504. The unique identifier can correspond to a MAC address. At step 506, the provider device receives, from the server, an indicator to monitor for a request from the client device. The request is for network access for the client device.

At step 508, in response to receiving the indicator, the provider device monitors for the request from the client device. At step 510, the provider device receives the request from the client device. The request includes the unique identifier of the client device. The monitoring for the request and the receiving the request can be based on a predetermined network frequency or configuration.

At step 512, the provider device verifies whether the unique identifier of the client device is associated with the user account. At step 514, if the unique identifier of the client device is verified as being associated with the user account, the provider device provides access information to the client device for connecting to the provider device to obtain network access. Prior to such providing, the provider device can establish a peer-to-peer connection with the client device, and the client device provide the access information to the client device using the established peer-to-peer connection.

The receiving the unique identifier in step 504, the receiving the indicator in step 506, the monitoring in step 508, the receiving the request in step 510, the verifying in step 512 and the providing in step 514 can be performed for multiple client devices, each of which has a unique identifier. The process then ends at end block 516.

Figure 6:
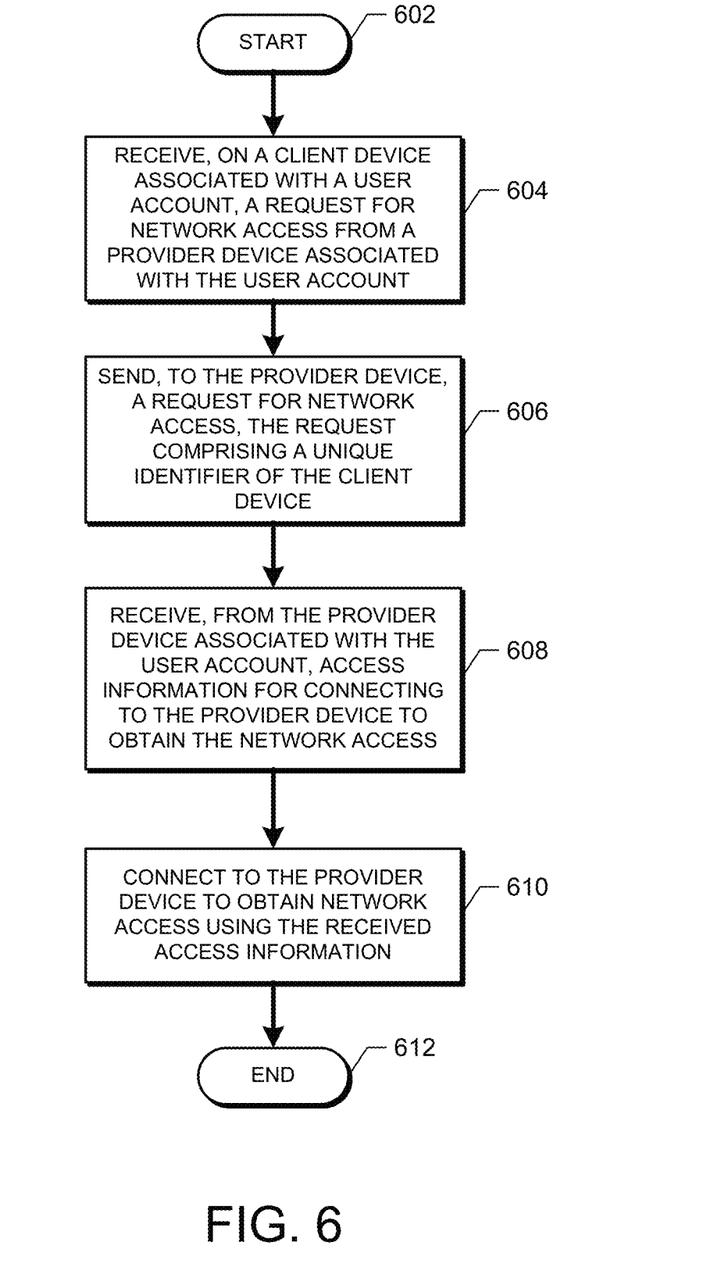
FIG. 6 illustrates an example process, performed by a client device associated with a user account, by which the client device is connected to a provider device associated with the user account for network access.

FIG. 6 illustrates an example process, performed by a client device associated with a user account, by which the client device is connected to a provider device associated with the user account for network access. For example, the client device can correspond to any of client devices 102-106 or to client device 306.

Following start block 602, the client device receives a request for network access from a provider device associated with the user account at step 604. The provider device can be one of multiple provider devices associated with the user account. The provider device can be selected from among the multiple provider devices based on a proximity of the provider device relative to the client device.

At step 606, the client device sends (e.g., in the form of a broadcast), to the provider device, a request for network access, the request comprising a unique identifier of the client device. The sending the request can be based on a predetermined network frequency or configuration. The unique identifier can correspond to a MAC address. The request for network access can be received from a user, and sending the request can be performed in response to the received input from the user. Alternatively, or in addition, the request for network access can be an automated request, and the sending the request can be performed in response to the automated request.

At step 608, the client device receives, from the provider device associated with the user account, access information for connecting to the provider device to obtain the network access. At step 610, the client device connects to the provider device to obtain network access using the received access information. Prior to receiving the access information and connecting to the provider device, the client device can establish a peer-to-peer connection with the provider device. The receiving the access information and the connecting to the provider device can be performed using the established peer-to-peer connection. The process then ends at end block 612.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
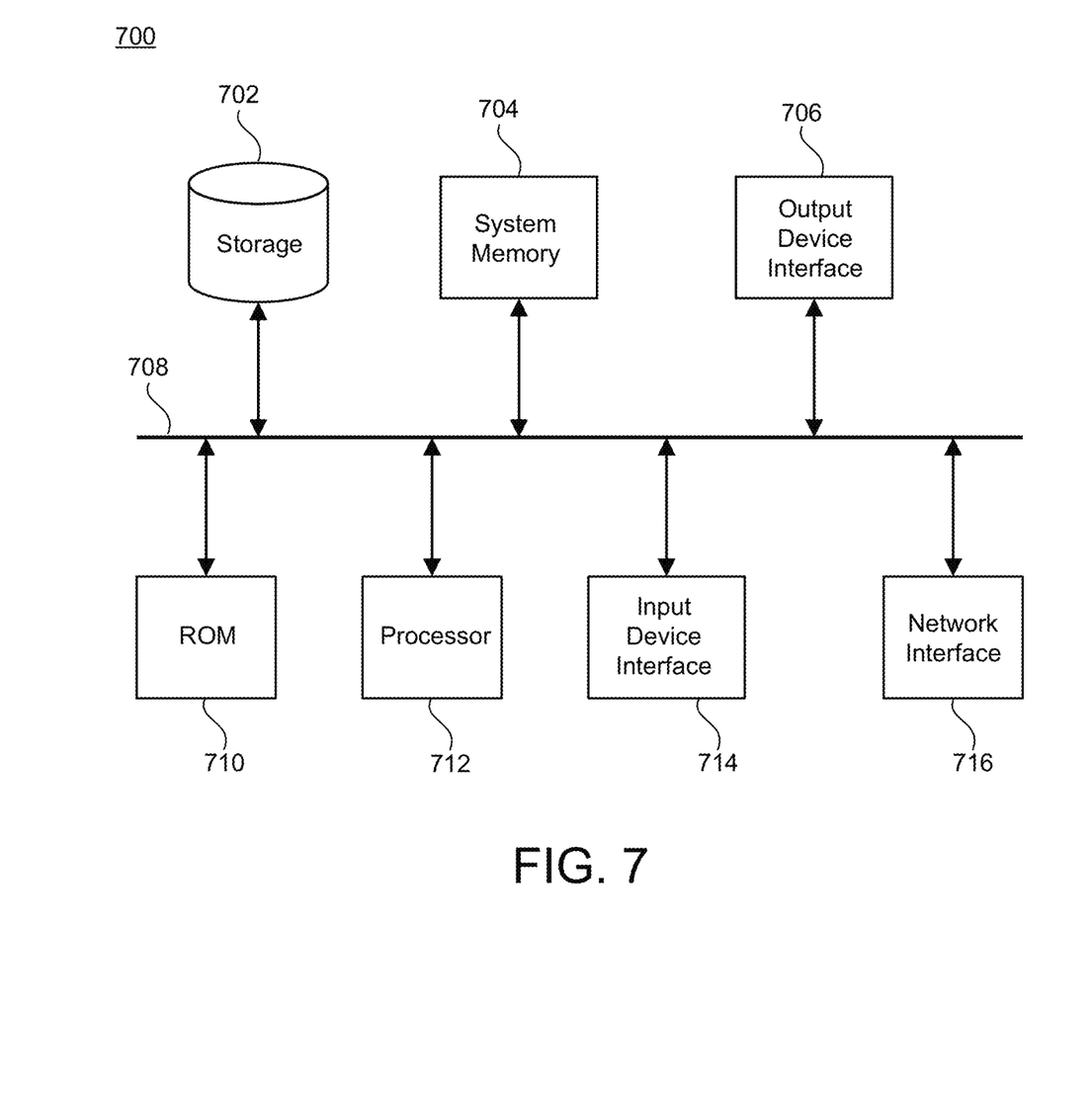
FIG. 7 conceptually illustrates an electronic system with which some implementations of the subject technology are implemented.

FIG. 7 conceptually illustrates an electronic system with which some implementations of the subject technology are implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for providing network access to a client device associated with a user account in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for registering a client device to obtain network access from a provider device, the method comprising:
    receiving, at a server, an authorization request for a user account to provide network access from one or more provider devices associated with the user account to one or more client devices associated with the user account;
    receiving a unique identifier for each of the one or more client devices;
    providing, from the server, the unique identifier for each of the one or more client devices to each of the one or more provider devices; and
    providing an indication to at least one of the one or more provider devices to monitor for a request for network access from at least one of the one or more client devices, the request from the at least one client device comprising the unique identifier of the at least one client device,
    wherein the at least one provider device is configured to provide network access information to the at least one client device in response to the request,
    wherein the one or more client devices and the one or more provider devices are designated, via a user interface, by a user of the user account,
    wherein the user interface displays a first list of devices for the user to select the one or more provider devices, and displays a second list of devices for the user to select the one or more client devices, and
    wherein the first list of devices corresponds to a subset of all devices associated with the user account, the subset limited to devices capable of acting as a hotspot.

2. The method of claim 1, wherein the unique identifier for each of the one or more client devices comprises a MAC address.

3. The method of claim 1, further comprising receiving authentication information for the user account.

4. The method of claim 3, further comprising providing for display of the user interface associated with the user account.

5. The method of claim 4, wherein the second list of devices corresponds to a second subset of all devices associated with the user account, the second subset limited to devices capable of connecting to a hotspot.

6. The method of claim 4, wherein the user interface provides for receiving the unique identifier for each of the one or more client devices.

7. A system for registering a client device to obtain network access from a provider device, the system comprising:
    one or more processors; and
    a machine-readable medium comprising instructions stored therein, which when executed by the processors, cause the processors to perform operations comprising:
        receiving an authorization request for a user account to provide network access from one or more provider devices associated with the user account to one or more client devices associated with the user account;
        receiving a unique MAC address for each of the one or more client devices;
        providing the unique MAC address for each of the one or more client devices to each of the one or more provider devices; and
        providing an indication to at least one of the one or more provider devices to monitor for a request for network access from at least one of the one or more client devices, the request from the at least one client device comprising the unique MAC address of the at least one client device,
    wherein the at least one provider device is configured to provide network access information to the at least one client device in response to the request,
    wherein the one or more client devices and the one or more provider devices are designated, via a user interface, by a user of the user account,
    wherein the user interface displays a first list of devices for the user to select the one or more provider devices, and displays a second list of devices for the user to select the one or more client devices, and
    wherein the first list of devices corresponds to a subset of all devices associated with the user account, the subset limited to devices capable of acting as a hotspot.

8. A computer-implemented method for providing network access to a client device, the method comprising:
    receiving, from a server, a unique identifier for a client device associated with a user account;
    receiving, from the server, an indicator to monitor for a request from the client device, wherein the request is for network access for the client device;
    monitoring, in response to receiving the indicator, for the request from the client device;
    receiving the request from the client device, the request comprising the unique identifier of the client device;
    verifying whether the unique identifier of the client device is associated with the user account; and
    providing, if the unique identifier of the client device is verified as being associated with the user account, access information to the client device for connecting to a provider device associated with the user account to obtain network access,
    wherein the client device and the provider device are designated, via a user interface, by a user of the user account,
    wherein the user interface displays a first list of devices for the user to select the provider device, and displays a second list of devices for the user to select the client device, and
    wherein the first list of devices corresponds to a subset of all devices associated with the user account, the subset limited to devices capable of acting as a hotspot.

9. The method of claim 8, wherein the unique identifier comprises a MAC address.

10. The method of claim 8, wherein the receiving the unique identifier, the receiving the indicator, the monitoring, the receiving the request, the verifying and the providing are performed for multiple client devices, each of which has a unique identifier.

11. The method of claim 8, further comprising:
establishing a peer-to-peer connection with the client device,
wherein the providing the access information to the client device is performed using the established peer-to-peer connection.

12. The method of claim 8, wherein the monitoring for the request and the receiving the request are based on a predetermined network frequency or configuration.

13. A provider device, associated with a user account, for providing network access to a client device, the device comprising:
one or more processors; and
a machine-readable medium comprising instructions stored therein, which when executed by the processors, cause the processors to perform operations comprising:
receiving, from a server, a unique identifier for the client device associated with the user account;
receiving, from the server, an indicator to monitor for a request from the client device, wherein the request is for network access for the client device;
monitoring, in response to receiving the indicator, for the request from the client device;
receiving the request from the client device, the request comprising the unique identifier of the client device;
verifying whether the unique identifier of the client device is associated with the user account; and
if the unique identifier of the client device is verified as being associated with the user account,
establishing a peer-to-peer connection with the client device; and
providing access information to the client device for connecting to the provider device to obtain network access, via the established peer-to-peer connection, and
wherein the client device and the provider device are designated, via a user interface, by a user of the user account,
wherein the user interface displays a first list of devices for the user to select the provider device, and displays a second list of devices for the user to select the client device, and
wherein the first list of devices corresponds to a subset of all devices associated with the user account, the subset limited to devices capable of acting as a hotspot.

14. A computer-implemented method for connecting a client device to a provider device for network access, the method comprising:
receiving, on a client device associated with a user account, a request for network access from a provider device associated with the user account;
sending, to the provider device, a request for network access, the request comprising a unique identifier of the client device;
receiving, from the provider device associated with the user account, access information for connecting to the provider device to obtain the network access; and
connecting to the provider device to obtain network access using the received access information,
wherein the client device and the provider device are designated, via a user interface, by a user of the user account,
wherein the user interface displays a first list of devices for the user to select the provider device, and displays a second list of devices for the user to select the client device, and
wherein the first list of devices corresponds to a subset of all devices associated with the user account, the subset limited to devices capable of acting as a hotspot.

15. The method of claim 14, wherein the unique identifier comprises a MAC address.

16. The method of claim 14, wherein the provider device is one of multiple provider devices associated with the user account and designated by the user of the user account.

17. The method of claim 16, wherein the provider device is selected from among the multiple provider devices based on a proximity of the provider device relative to the client device.

18. The method of claim 14, wherein the request for network access is received from a user, and wherein the sending the request is performed in response to the received input from the user.

19. The method of claim 14, wherein the request for network access is an automated request, and wherein the sending the request is performed in response to the automated request.

20. The method of claim 14, further comprising:
establishing a peer-to-peer connection with the provider device,
wherein the receiving the access information and the connecting to the provider device are performed using the established peer-to-peer connection.

21. The method of claim 14, wherein the sending the request is based on a predetermined network frequency or configuration.

22. A client device, associated with a user account, for connecting to a provider device for network access, the device comprising:
one or more processors; and
a machine-readable medium comprising instructions stored therein, which when executed by the processors, cause the processors to perform operations comprising:
receiving a request for network access from the provider device associated with the user account;
sending, to the provider device, a request for network access, the request comprising a unique identifier of the client device;
establishing a peer-to-peer connection with the provider device;
receiving, from the provider device associated with the user account and via the established peer-to-peer connection, access information for connecting to the provider device to obtain the network access; and
connecting, via the established peer-to-peer connection, to the provider device to obtain network access using the received access information, and
wherein the client device and the provider device are designated, via a user interface, by a user of the user account,
wherein the user interface displays a first list of devices for the user to select the provider device, and displays a second list of devices for the user to select the client device, and
wherein the first list of devices corresponds to a subset of all devices associated with the user account, the subset limited to devices capable of acting as a hotspot.

* * * * *